July 14, 1964 O. HAUGWITZ 3,140,576
CABLE MAKING APPARATUS
Filed July 30, 1962 4 Sheets-Sheet 1

July 14, 1964   O. HAUGWITZ   3,140,576
CABLE MAKING APPARATUS
Filed July 30, 1962   4 Sheets-Sheet 4

United States Patent Office 3,140,576
Patented July 14, 1964

1

3,140,576
CABLE MAKING APPARATUS
Otto Haugwitz, La Celle Saint Cloud, France, assignor to Societe Anonyme Geoffroy-Delore, Paris, France, a French company
Filed July 30, 1962, Ser. No. 213,276
Claims priority, application France July 29, 1961
6 Claims. (Cl. 57—13)

This invention relates to cable making apparatus of the type, in which are assembled together layer by layer, various elements, such as bare wires or insulated wires, or groups of elements such as pairs, quads or strands, with retention of the layers and/or insulation by wrapping and/or taping.

It is an object of this invention to provide an improved cable making apparatus.

According to this invention, there is provided cable-making apparatus comprising a feeding mechanism adapted to supply a cable core element to an assembling mechanism where one or more layers of elements are to be assembled about said core element, means for rotating said feeding mechanism about the axis of the assembly mechanism so as to rotate said core element about its axis, said assembling mechanism comprising two groups of supply frames for each layer to be assembled, such frames carrying supports for the elements to be assembled, a set of guide pulleys and associated guide tubes, there being one pulley and one tube per element to be assembled from the supports of the supply frames, a distribution grid adapted to guide the elements so that those of one group alternate with those of the other group, a die adapted to bring together all the elements, a wrapping mechanism following the die and adapted to apply a wrapping to retain the assembled layer, the said assembling mechanism being repeated as many times as there are layers to be assembled; means for moving the cable assembly axially, a reception station for the finished cable, and means for rotating such reception station synchronously with the feeding mechanism.

In order that this invention may more readily be understood, reference will now be made by way of example to the accompanying drawings in which.

Figure 1:
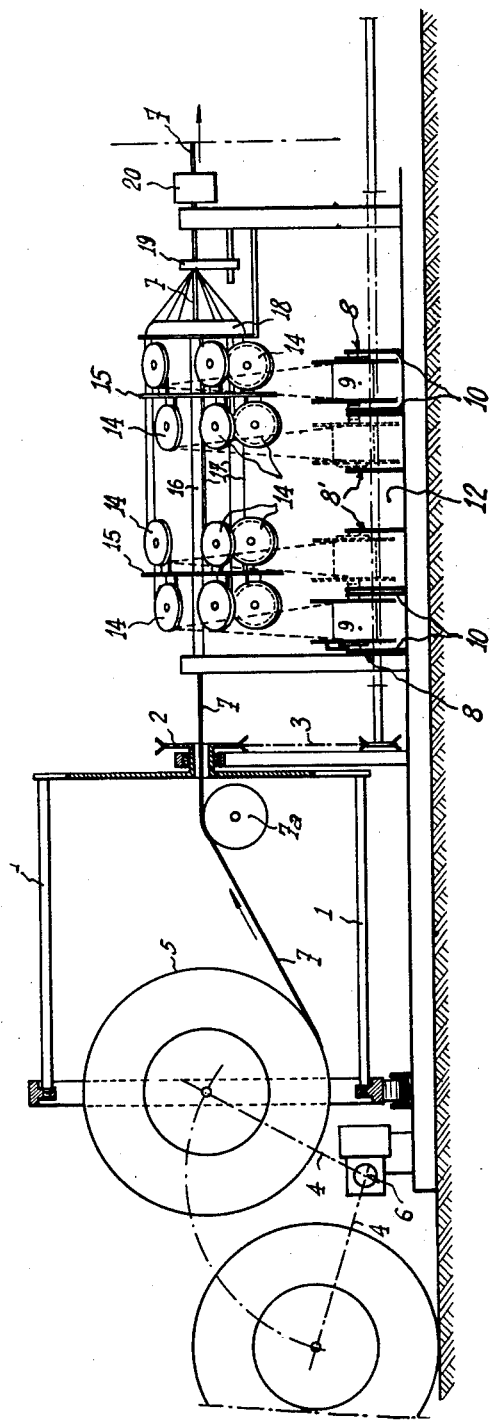
FIGURE 1 is a side elevation of part of one embodiment of apparatus according to this invention, this part comprising the feed mechanism and the assembling mechanism, i.e. the mechanism which brings together the elements forming the cable or a layer of the cable.

As shown in FIGURE 1 the feed mechanism comprises a cradle 1 adapted to be rotated by means of a hollow pulley 2, through which is adapted to pass a central cable element 7, and a belt 3 synchronised with the reception

2 station illustrated in FIGURE 2, and which will be described hereinafter.

A detachable support, represented diagrammatically by the dot-dash line 4, is provided for a reel 5. When the assembling mechanism is stopped, this support 4 engages a reel 5 and may be swung downwardly about a pivot 6, in order to permit an exhausted reel to be replaced by a full one. Cradle 1 includes means for grasping and rotating reel 5 in conventional manner about its major axis. Therefore during operation reel 5 rotates about its major axis as well as about the major axis of cradle 1.

The cable element 7 issues from the reel 5 and is guided to the assembling mechanism in the direction indicated by the arrows by a pulley 7a to which the general longitudinal axis of the apparatus is in a tangential relationship.

Figure 3:
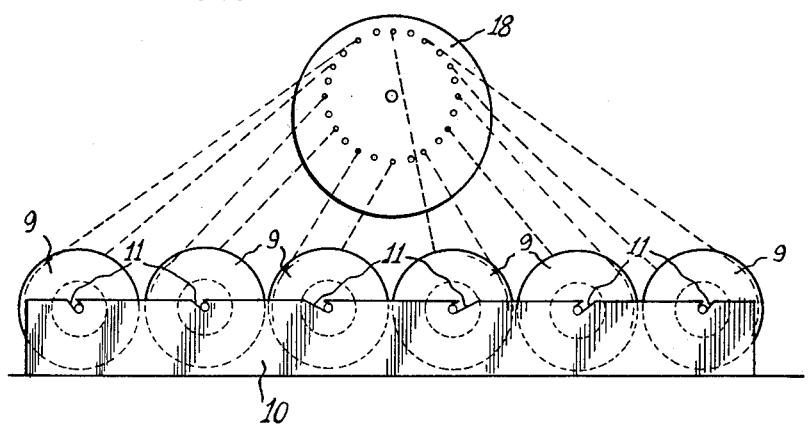
FIGURE 3 is an elevation of the supply frame of the assembling mechanism.
Figure 4:
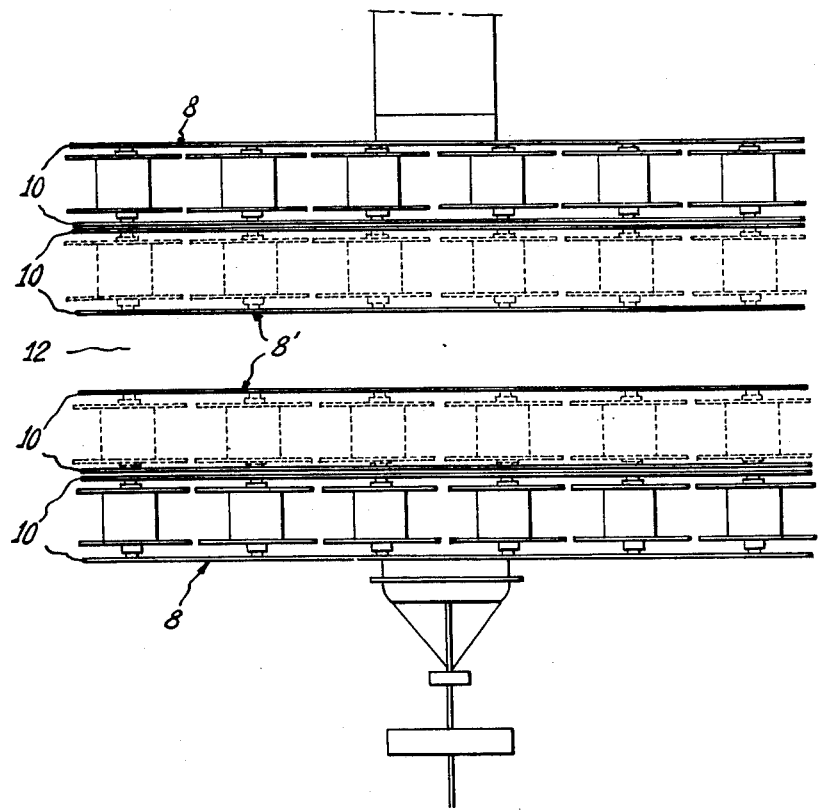
FIGURE 4 is a plan view of this supply frame.

Reference will now be made to FIGURES 1, 3 and 4 for a description of the assembling mechanism which constitutes the main part of the apparatus according to the invention.

A fixed supply frame, to which the general reference numeral 8 is allocated and which is preferably duplicated as shown in the drawings in order to enable the number of elements for simultaneous assembly to be increased, is fixed on the bed of the apparatus and extends perpendicularly to the axis of the apparatus and partly below the latter. This pair of supply frames 8 carries reels 9, two of which are shown in FIGURE 1, so that their shafts are parallel to the axis of the apparatus. These shafts are equipped with an internal brake in order to permit regulation of the unwinding process, in any known manner.

Each frame 8 comprises two parallel vertical metal plates 10 formed along their upper edges with inclined notches 11 (FIGURE 3) which are intended to receive the shafts of the reels 9. These shafts can rotate freely in these notches, the directions of which form angles the inclination of which in each case depends on the position of the reel relatively to the axis of the apparatus and is such that the tension of the element which is unwinding from a reel is substantially perpendicular to the direction of inclination of the notch, thereby avoiding the necessity of providing some other means for locking the shaft of the reel.

Figure 6:
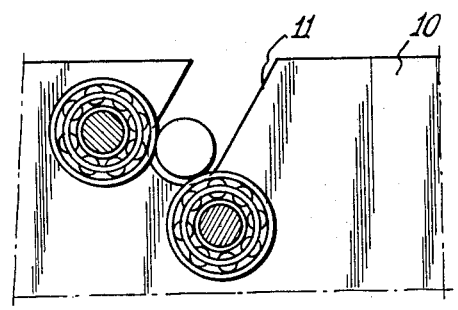
FIGURE 6 is a view of a detail of the supply frame.

In order to reduce the friction of the shafts of the reels on the metal plates 10 constituting the frame, it is possible to use ball or roller bearings for carring the ends of these shafts, as is illustrated in FIGURE 6. The pair of fixed supply frames 8 is associated with another pair of identical fixed supply frames 8' which are also arranged on the bed of the apparatus and are shown in dot-dash lines in FIGURES 1 and 4. The symmetrical arrangement of the two pairs of supply frames 8 and 8' is such that a central corridor 12 (FIGURE 4) is provided permitting easy access to the reels of the two frames 8'. The reels of the two frames 8 are arranged to be accessible from the exterior.

The provision of a first pair of frames 8 and of a second pair of frames 8' has the object of making it possible to replace empty reels with full reels on one of the pairs of frames, whilst the assembling mechanism continues to operate, whilst being fed by the reels of the other pair of frames.

The number of reels carried by each pair of frames depends on the number of elements to be assembled simultaneously. In the example illustrated in the drawings, FIGURES 3 and 4, there are six reels per single frame, or 12 reels per pair of frames, permitting in this case the simultaneous assembly of 12 elements.

Figure 5:
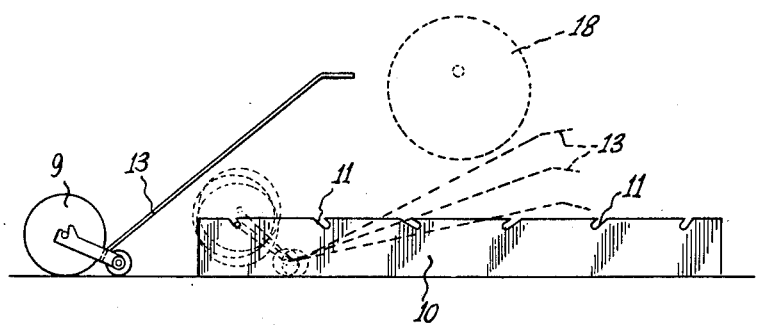
FIGURE 5 is a simplified elevation of the supply frame, and illustrates a truck used for loading and unloading the reels.

The loading of the reels on to the frames and the unloading of the reels from the frames are carried out rapidly with the help of a special truck 13 shown in FIGURE 5. The rapidity of handling is such that it is easy to exchange for full reels all the exhausted reels from a pair of supply frames which have been rendered inoperative and to thread the elements as far as the distribution grid, as will be explained hereinafter, before the elements, coming from the pair of supply frames which are in operation have been exhausted.

Each element unwinding from a reel 9 is wound about a guide pulley 14. The assembly of pulleys 14 is carried by a plate 15 which is fixed, for example with a hollow central tube 16.

On issuing from the guide pulley 14, each element is guided by a tube 17, represented diagrammatically in FIGURE 1 by a single line, to a distribution grid 18 which deals with all the elements to be assembled. The tubes 17 are distributed in such a manner that the elements coming from each of the two pairs of frames alternate in the distributing grid, as FIGURE 3 shows. In this figure, broken lines indicate the elements coming from the pair of supply frames which are in service. The guide holes in the distribution grid which are not occupied will be those which will receive the elements coming from the other pair of supply frames when the latter pair are brought into service.

The tubes 17 are arranged in such a way that they always pass behind the pulleys 14, in such a manner that they do not hinder the threading of the elements to be assembled. For this purpose, they are slightly curved adjacent the pulleys.

Upon issuing from the distribution grid 18, the various elements are grouped in a die 19 for assembly on the rotating element 7.

The elements thus assembled then pass into a wrapping mechanism indicated diagrammatically at 20, which immediately follows the die in the direction of advance of the cable. As is known, the wrapping mechanism winds about the cable, in a helical manner, a layer of threads which retain the assembly in position. Such wrapping mechanisms are well known and there is no need to describe them here.

Figure 2:
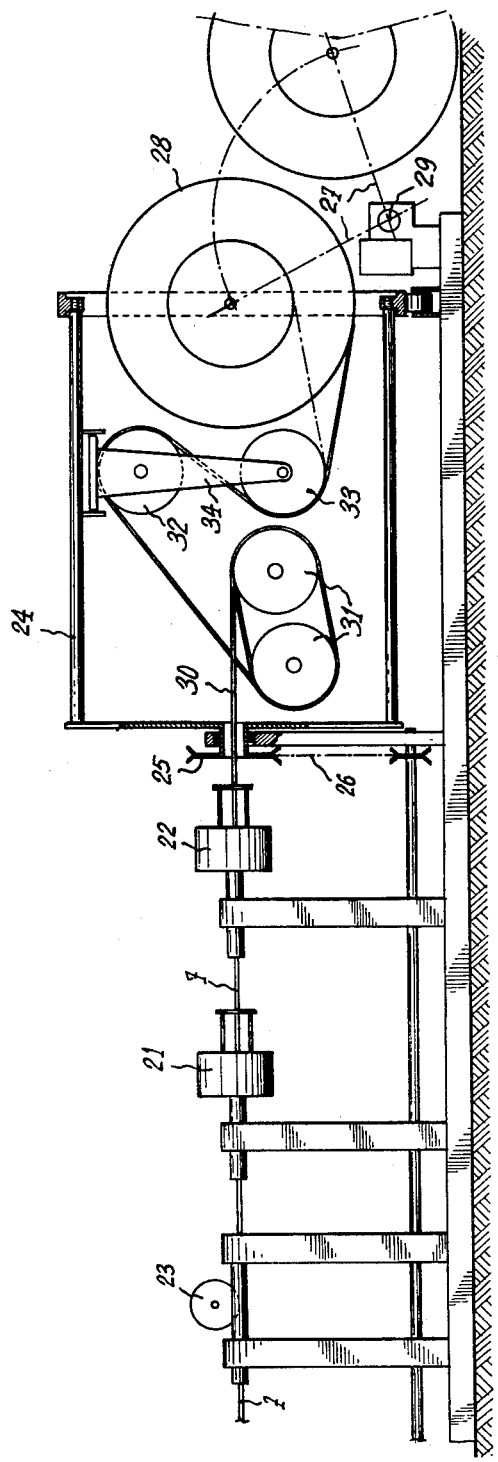
FIGURE 2 is a side elevation of the remainder of the apparatus which is located following the assembling mechanism i.e. is to the right of the part shown in FIGURE 1, the part shown in FIGURE 2 being a taping station and a reception station.

In FIGURE 2, the taping station is shown as comprising the two taping mechanisms 21 and 22. These are illustrated diagrammatically only. The number of taping mechanisms will, of course, depend on the number of layers of covering which it is desired to execute.

Also shown, at 23, is a pulley about which the assembled and wrapped elements are looped one or more times and which is rotated about the axis of the apparatus synchronously with the rotation of the element 7, the pulley 23 thus constituting a relay device as far as the pulling of the assembled cable is concerned, when the total length of the apparatus is too great to permit of regular linear entrainment.

The reception station comprises a cradle 24 adapted to be rotated by means of a hollow pulley 25, through which the assembled cable extends, and a belt 26, synchronously with the feed mechanism illustrated in FIGURE 1 and described hereinbefore.

The cradle 24 carries a support indicated diagrammatically by the broken line 27 which is similar to support 4 as heretofore described, which carries a reel 28. This support 27 can swing about a pivot 29, when the assembling mechanism is stopped, to permit a full reel to be replaced by an empty reel. Cradle 24 includes means for grasping and rotationally driving reel 28 about its major axis. Therefore reel 28 simultaneously rotates about its own major axis and the major axis of cradle 24.

The assembled cable 30, arriving from the outlet side of the last taping mechanism 22, passes over a double pulley 31 driven by conventional means not shown which exerts a pulling effect on the cable, and then over guide pulleys 32 and 33 mounted on a support 34 fixed to the cradle 24, finally to be wound on to the receiving reel 28.

The apparatus according to the invention constitutes a complete apparatus for the assembling of elements to form a cable, with a feed mechanism and a reception station rotating about the axis of the cable which is thus itself driven in rotation about its axis and is simultaneously given an axial linear motion.

The assembling mechanism which is illustrated in FIGURE 1 can be repeated in the longitudinal direction of the apparatus as many times as is necessary depending on the number of layers of elements to be assembled successively.

The taping station which is illustrated in FIGURE 2, will comprise the desired number of taping mechanisms depending on the number of layers of tape and may also be repeated as many times as is necessary.

The pulley 23 constituting a pulling relay, which is illustrated in FIGURE 2, may be replaced by a set of rollers which deflect the assembled elements from its course.

The arrangement of the supply frames 8 and 8' may be modified, for example by using a maximum number of rows and of reels per row, or by reducing the number of rows and of reels per row, or by reducing the number of rows and reels and extending the apparatus, depending on the dimensions of the site available for its installation.

The assembling mechanism has been shown with supply frames carrying reels. However, it would be possible to feed this material from cans instead of reels, placing the cans in transverse lines relatively to the axis of the apparatus, in double rows symmetrically or unilaterally.

I claim:
1. Cable making apparatus comprising means for supporting a reel of cable core material, means for rotating said reel supporting means about an axis, a plurality of assembling mechanisms arranged one behind the other along said axis, each of said mechanisms comprising two groups of supply frames for elements to be assembled in a layer on said core, supports for said elements mounted on said supply frames, guide means for each of said elements, a distribution grid adapted to guide said elements so that those of one group alternate with those of the other group around said axis, a die positioned on said axis to receive the elements from said grid and bring them together onto said core, wrapping means following said die and adapted to apply a wrapping to retain the cable assembly formed by the elements on the core, means for moving the cable assembly axially, a reception station including a reel, and means for rotating said reception station about the direction of movement of the cable assembly synchronously with the means for supporting the reel of cable core material as said cable assembly enters the reception station.

2. The apparatus specified in claim 1, in which each said distribution grid comprises a disc having a core aperture for passage therethrough of the cable core and a series of apertures for passage therethrough of said elements, said series of apertures being arranged in a circle around said core aperture.

3. The apparatus specified in claim 1 in which said guide means comprise a guide pulley and a guide tube for each of said elements.

4. The apparatus specified in claim 1 in which the reception station includes a set of pulleys adapted to be driven so that they exert an axial pulling force on the cable assembly.

5. The apparatus specified in claim 1 including cable pulley means, said cable pulley means being rotatable about the axis of the cable assembly synchronously with the reception station.

6. Cable making apparatus comprising a cable core supply means, means for rotating said supply means about a feed axis coincident with the direction of movement of the core so that said core is rotated about said axis, two groups of supply frames, each said supply frame comprising two upstanding plates having notches in their upper portions, reels for carrying elements to be assembled about the core and shafts mounting said reels in said notches, said notches having an inclination such that the direction of inclination of each notch is substantially perpendicular to the tractive force of the element unwinding from its associated reel guide means for each of said elements, a distribution grid adapted to guide said elements so that those of one group alternate with those of the other group around said axis, a die positioned on said axis to receive the elements from said grid, and bring together, the core and the elements of one of said groups, wrapping means following said die and adapted to apply a wrapping to retain the assembled core and elements together is a cable assembly, means for moving the cable assembly axially, a reception station for the finished cable and means for rotating said reception station synchronously with the feeding means.

References Cited in the file of this patent

UNITED STATES PATENTS

| | | |
|---|---|---|
| 16,790 | Cushman | Mar. 10, 1857 |
| 23,785 | Rinek | Apr. 26, 1859 |
| 1,992,707 | Lloyd | Feb. 26, 1935 |
| 3,044,244 | Merritt | July 17, 1962 |

OTHER REFERENCES

Pirelli-General, German printed application 1,042,684 (Kl. 21c 3/04), Nov. 6, 1958.